F. A. SCHULZ.
DRILL POST.
APPLICATION FILED MAR. 20, 1911.
1,000,125.
Patented Aug. 8, 1911.
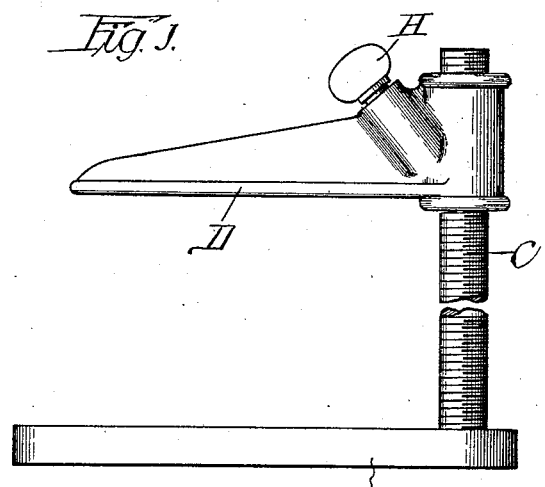
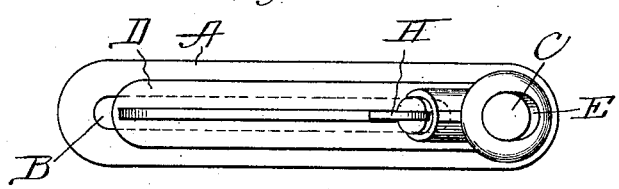
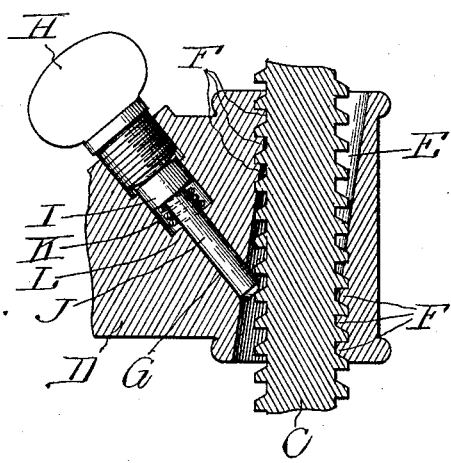
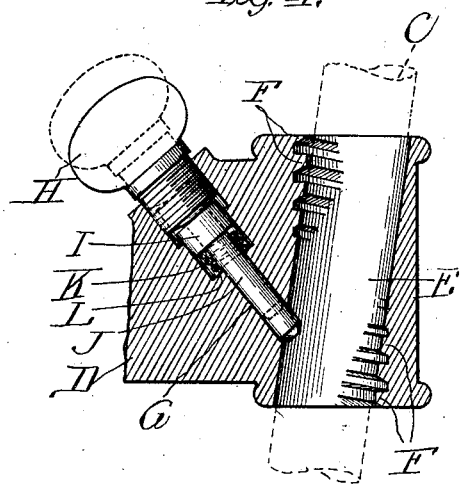

UNITED STATES PATENT OFFICE.

FRITZ A. SCHULZ, OF CHICAGO, ILLINOIS.

DRILL-POST.

1,000,125.  Specification of Letters Patent.  Patented Aug. 8, 1911.

Application filed March 20, 1911.  Serial No. 615,762.

*To all whom it may concern:*

Be it known that I, FRITZ A. SCHULZ, citizen of the United States, residing at Chicago, in the county of Cook and State of Illinois, have invented certain new and useful Improvements in Drill-Posts; and I do hereby declare the following to be a full, clear, and exact description of the invention, such as will enable others skilled in the art to which it appertains to make and use the same.

This invention relates to improvements in a drill post commonly known by mechanics as an "old man", the object being to provide a device of this character which can be readily and quickly adjusted to accommodate the work and tools interposed between the jaws thereof, and consists in the features of construction and combinations of parts hereinafter fully described and claimed.

In the accompanying drawings illustrating the invention: Figure —1— is a view in side elevation of a drill post of the character described constructed in accordance with my invention. Fig. —2— is a top plan view of the same. Fig. —3— is a fragmentary detail longitudinal section of the same on an enlarged scale on the line 3—3 of Fig. —2—. Fig. —4— is a view similar to Fig. —3—, the threaded standard being shown in dotted lines in released position.

Drill posts of the character illustrated are used mainly by metal workers for the purpose of providing a counter pressure member for the ratchet drills used for drilling relatively large holes in rails, I-beams and structural iron of all kinds; and by machinists for drilling holes in large castings such as machine standards and the like, the mode of procedure being the same in all instances. The drill post or "old man" always comprises a base member A, usually provided with a longitudinal slot B, and in one end of which the threaded standard C is rigidly secured. The threaded standard carries the other jaw D which is moved toward or away from the base member or fixed jaw A by rotating it relatively to the standard.

In use the base member or fixed jaw A is rigidly secured to the member through which a hole is to be drilled by means of a clamp or clamps or by means of one or more bolts where possible, the upper face of said jaw A opposing the lower face of the part to be drilled. The jaw D is then adjusted relatively to the upper face of the part to be drilled so as to provide just sufficient room between the same to receive the ratchet drill usually employed, the stock of the latter bearing upon the lower face of said jaw D and the drill point bearing upon the upper face of the member to be bored.

My invention has for its sole object to provide means for rapidly moving the jaw D longitudinally of the standard C without relative rotation of the said parts. To this end I provide in the jaw D an opening E for the passage of said standard C. The said opening is enlarged at opposite end portions and at diametrically opposite sides so that at its ends said opening appears elliptical. The method employed in forming said opening F is to first bore a hole of requisite diameter and thread the same to fit and receive the threaded standard C. Then a second hole slightly greater in diameter than the shaft C and adapted to permit free longitudinal movement of the latter therein is bored on an axis extending angularly to the axis of the threaded hole and intersecting the latter midway between the ends of the first hole bored. In effect the second boring operation serves only to cut away the threads of the first hole at opposite sides and ends thereof. Thus only those threads F disposed beyond the sphere of operation of the second drill are left at opposite sides and ends of the opening E. Thus a relative pivotal movement of the shaft C and jaw D on a horizontal axis coincident with the point of intersection of the axes of the first and second bore forming the opening E will serve to engage the shaft C with the threads F or will serve to release the same from engagement therewith and thereby permit of free longitudinal movement of the jaw D on the said shaft C without relative rotation thereof. To permit said free relative longitudinal movement of the jaw D and shaft C it is necessary to drop the free end portion of the former relatively to the end thereof through which the shaft C passes. When the device is disposed in an upright or approximately upright position as shown in Fig. —1—, the said jaw D will naturally turn relatively to the axis of the shaft A into position to release the threads of both members from engagement with each other. To prevent this I provide in the jaw D an angularly disposed opening G extending from the upper face thereof to the lower end of the opening E with which it communicates, the last-named end of said opening meeting the opening E at a point diametrically opposed to the lower threads F therein. Said opening G is annularly enlarged at its upper end portion, the said enlarged portion adjacent the upper face of the jaw D being threaded to receive the shank of a thumb-screw H. The latter is adapted to bear upon the head portion I of a plunger J, the shank portion of which passes through the lower end portion of said opening G, and project into the opening E, the said thumb-screw being adapted to vary the projection of said shank into said opening E, against the action of a compression spring K interposed between the head portion I of said plunger and the annular shoulder L formed between the portions of different diameter of said opening G, said spring being adapted to normally withdraw said plunger from projection into the said opening E.

In operation, the thumb-screw H is turned to permit the spring to withdraw the plunger J from projection into said opening E when it is desired to adjust said jaw D to a different position relatively to the jaw A and after such adjustment has been effected, said thumb-screw is turned in the opposite direction to project said plunger into said opening E, and into engagement with the said shaft C, thereby preventing the disengagement of the threads thereof with the threads F, as shown in Fig. 3.

I claim as my invention:

1. In a device of the kind specified, the combination with a threaded standard, and a member having an opening for the passage thereof threaded at opposite sides and ends and enlarged at points diametrically opposed to the respective threaded portion, of a plunger mounted in an opening angularly disposed relatively to the first-named opening and communicating with the latter at a point diametrically opposed to one of said threaded portions, and means controlling said plunger to project the same into and withdraw the same from said first-named opening, whereby the engagement of the threads of said standard with said threads of said first-named opening is controlled.

2. In a device of the kind specified, the combination with a threaded standard, and a member having an opening for the passage thereof threaded at opposite sides and ends and enlarged at points diametrically opposed to the respective threaded portion, of a plunger mounted in an opening angularly disposed relatively to the first-named opening and communicating with the latter at a point diametrically opposed to one of said threaded portions, a spring normally maintaining said plunger at the rearward limit of its movement and withdrawn from the projection into said first-named opening, and a thumb-screw adapted to project said plunger against the action of said spring.

In testimony whereof I have signed my name in presence of two subscribing witnesses.

FRITZ A. SCHULZ.

Witnesses:
M. M. BOYLE,
H. L. HALE.

---

Copies of this patent may be obtained for five cents each, by addressing the "Commissioner of Patents, Washington, D. C."